United States Patent [19]
Connelly et al.

[11] 3,899,427
[45] Aug. 12, 1975

[54] DEVICE FOR SEPARATING PARTICLES FROM A FLUID STREAM

[75] Inventors: Thomas Macfarlane Connelly, Eaglesham; Ian George Rowe; Douglas Stewart Morrison, both of Edinburgh, all of Scotland

[73] Assignee: Begg Cousland & Co. Ltd., Glascow, Scotland

[22] Filed: June 7, 1973

[21] Appl. No.: 367,809

[30] Foreign Application Priority Data
June 10, 1972 United Kingdom............... 27213/72

[52] U.S. Cl. ................. 210/521; 55/440; 209/156; 209/506
[51] Int. Cl.[2] ......................................... B01D 21/00
[58] Field of Search ....... 210/521; 55/440; 209/211, 209/356, 156, 506

[56] References Cited
UNITED STATES PATENTS

| | | |
|---|---|---|
| 1,818,994 | 8/1931 | Kreisinger........................ 55/440 X |
| 1,896,656 | 2/1933 | Anderson........................ 55/440.4 X |
| 1,928,706 | 10/1933 | Sillers .............................. 55/440 X |
| 2,595,838 | 5/1952 | Fuglie.............................. 210/521 X |
| 3,338,035 | 8/1967 | Dinkelacker.......................... 55/440 |
| 3,358,580 | 12/1967 | Freese et al. ..................... 55/440 X |
| 3,520,116 | 7/1970 | Good ................................... 55/440 |
| 3,771,430 | 11/1973 | Lane..................................... 55/440 |

FOREIGN PATENTS OR APPLICATIONS
1,098,155  7/1955  France ............................... 210/521

*Primary Examiner*—Theodore A. Granger
*Attorney, Agent, or Firm*—Larson, Taylor & Hinds

[57] ABSTRACT

A device for separating particles from a fluid stream comprises at least one separating unit incorporating a plurality of spaced parallel plates formed with troughs and crests. Projecting vanes are attached to the plates in the troughs. The vanes are on the downstream sides of the troughs and lean towards the upstream sides of the respective troughs.

8 Claims, 3 Drawing Figures

DEVICE FOR SEPARATING PARTICLES FROM A FLUID STREAM

The subject of this invention is a device of the so-called wave-plate type for separating particles from a fluid stream, e.g. for separating liquid particles from a stream of gaseous material or for separating solid particles from a stream of liquid.

Separators of the so-called wave-plate type (also sometimes referred to as corrugated or chevron or louvre plate type) employ plates formed with crests and troughs and arranged in spaced generally parallel relationship. The plates are usually formed with zig-zags or chevrons having crests and troughs and the fluid passes between the plates in a direction transverse to the lines of the crests and troughs.

As a result of experiments conducted on the operation of separators of the said so-called wave-plate type it has been found that when a fluid containing separable particles is passed between the plates the particles lying beyond a certain critical distance from the nearest plate pass between the plates without coming into contact with the plates no matter how many crests and troughs are formed in the plates.

The reason for there being a critical distance lies in the undulating movement of the fluid across the crests and troughs of the plate. Each particle in the undulating fluid stream is subjected to forces consisting principally of two components one of which is the frictional drag of the fluid on the particle tending to force the particle to move in the same direction as the fluid in contact with it and the other of which is the force generated as the fluid swings around each crest. It will be appreciated that the rotational movement of the fluid around each crest has a transverse component directed towards the plate and this component is communicated to the entrained particle by the frictional drag thus tending to move the particle towards the plate. This movement is opposed by the desire of the particle to continue in a straight line which has an orientation transverse to the direction of flow around the crest so that the particle tends to move away from the plate. The magnitude of the force tending to move the particle away from the plate for any given particle size and velocity is a function of the distance of the particle from the centre of rotation of the particle around the crest. As the centre of rotation of the particle lies on the same side of the particle as the plate the component of the said force on the particle increases as the distance of the particle from the crest increases. There is thus a critical distance where the component of the said force directed away from the plate equals the component of frictional drag directed towards the plate and consequently any particle in the fluid stream at a distance from the plate equal to or greater than this critical distance will never reach the plate. It will be understood of course that there is a maximum limit by which the critical distance can be exceeded in the normal wave-plate separator employing several parallel plates, the maximum limit on the critical distance being equal to unity minus the critical distance because a particle lying beyond the said maximum limit is of course less than the critical distance from the next adjacent plate.

It will be seen from the foregoing explanation that a fluid containing separable particles flowing between the plates of the normal wave-plate separator will always still contain unseparated particles when it leaves the separator. It may be said that baffles and other obstructions placed between the plates beyond the critical distance from either of two adjacent plates have been found to be ineffectual, the fluid simply flowing around such obstructions and then resuming its normal course. The reason of course is that such obstructions simply act as short plates with the same conditions applying to them as apply to the wave plates.

It is obvious that the separation efficiency of any wave-plate separator could be greatly improved if the critical distance effect could be eliminated and it is an object of the present invention to do this.

A device according to the invention incorporates a plurality of plates formed with troughs and crests and arranged in at least one group constituting a separating unit, the median planes of the plates, (i.e. the planes equidistantly spaced between planes touched by the troughs and the crests), being parallel with one another, and projecting vanes attached to the plates, one vane in each trough on the downstream side of the trough with respect to the direction of fluid flow between the plates and orientated to lean in the direction towards the upstream side of the same trough.

The distance between the median planes of adjacent plates is preferably twice a critical distance such that the component of force on a particle contained in the fluid in a direction normal to and away from the plate resulting from the desire of the particle to continue in a straight line which has an orientation transverse to the direction of movement of the fluid as the fluid passes around the crests formed in the plate, is equal to the component of the frictional drag of the fluid on the particle in a direction normal to and towards the plate, said critical distance being calculable using known physical constants relating to the Reynolds number for the conditions of fluid flow, the density of the fluid, the particle size and the density of the particle material in conjunction with the geometrical configuration of the plates.

For the conditions of particle size often experienced (about 10 microns diameter) and velocity of fluid (25 feet/sec) the said critical distance lies within a range having minimum and maximum values of 0.40 and 0.46 times the distance between the median planes of the plates respectively.

In one embodiment of the invention the device includes two groups of plates arranged in a series offset from one another so that each plate of one group is opposite the space between two adjacent plates of the other group and spaced in a transverse direction from each of the said two plates of the other group a distance at least equal to the said critical distance.

The plates may be corrugated or may be of zig-zag formation.

The vanes may be formed integrally with the plates or may be formed as separate components attached to the plates.

Where the device incorporates more than two groups of plates each succeeding group of the series is preferably offset from the immediately preceding group to the same side as the second group is offset from the first group of the series.

In another embodiment of the invention the device incorporates at least two units as described arranged in series with the plates of the separate units orientated in substantially the same direction and a particle coalescing device disposed between the preceding unit and the succeeding unit of the series.

The particle-coalescing device may consist of a foraminous diaphragm which may be made of metallic or nonmetallic wool or may consist of several perforated plates parallel with and spaced from one another.

The position found most effective for the vanes on the downstream side of each trough is in a region nearer the bottom of the trough than the following crest.

Practical embodiments of the invention are illustrated in the accompanying semi-diagrammatic drawings in which.

Figure 1:
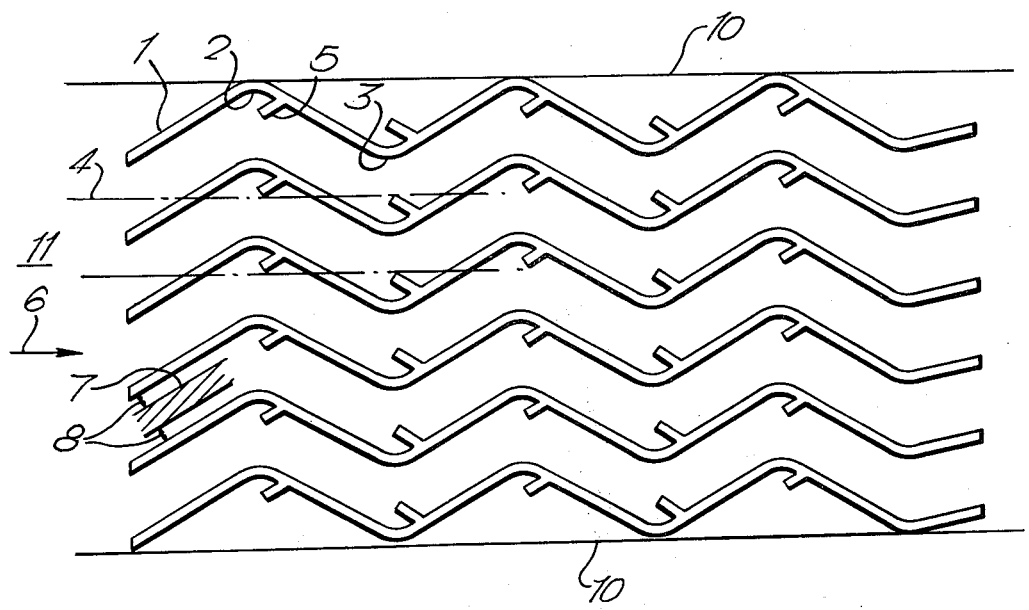
FIG. 1 illustrates a single unit device incorporating one group of plates.

A device according to the invention can consist of one unit as illustrated in FIG. 1 of a length containing a number of consecutive crests and troughs sufficient to remove substantially all the particles from a fluid stream. In certain circumstances, however, for example where the fluid carries an unusually high proportion of small particles, a single unit capable of providing complete separation might be inconveniently long. The embodiments of FIGS. 2 and 3 provide means for reducing the overall length of a particle-separating device considerably below that of a single unit device of similar capacity providing the same degree of separation.

In the drawings, the plates 1 are formed with troughs 2 and crests 3 arranged in at least one group constituting a separating unit within a casing (shown schematically at 10 in FIG. 1) of any known form for defining a fluid flow or stream path from inlet side 11 to outlet side 12. In the construction of FIG. 1 the unit is represented by the reference letter A and in the construction of FIGS. 2 and 3 the preceding unit is represented by the reference letter A and the succeeding unit by the reference letter B. 4 denotes median planes of the plates, said planes 4 being parallel with one another. Each plate 1 contains vanes 5 attached to the downstream side of the trough 2, the direction of flow through the unit being indicated by the arrow 6. Each vane 5 leans in the direction towards the upstream side of the same trough. Where the distance between adjacent plates is greater than twice the critical distance there is an escape zone which is referred to later in the specification. Such an escape zone is indicated by the shaded portion 7 in FIGS. 1 and 2 on the assumption that the adjacent plates illustrated are more than twice the critical distance apart, the critical distance being represented by the numeral 8. This distance has already been defined earlier in the specification.

Figure 2:
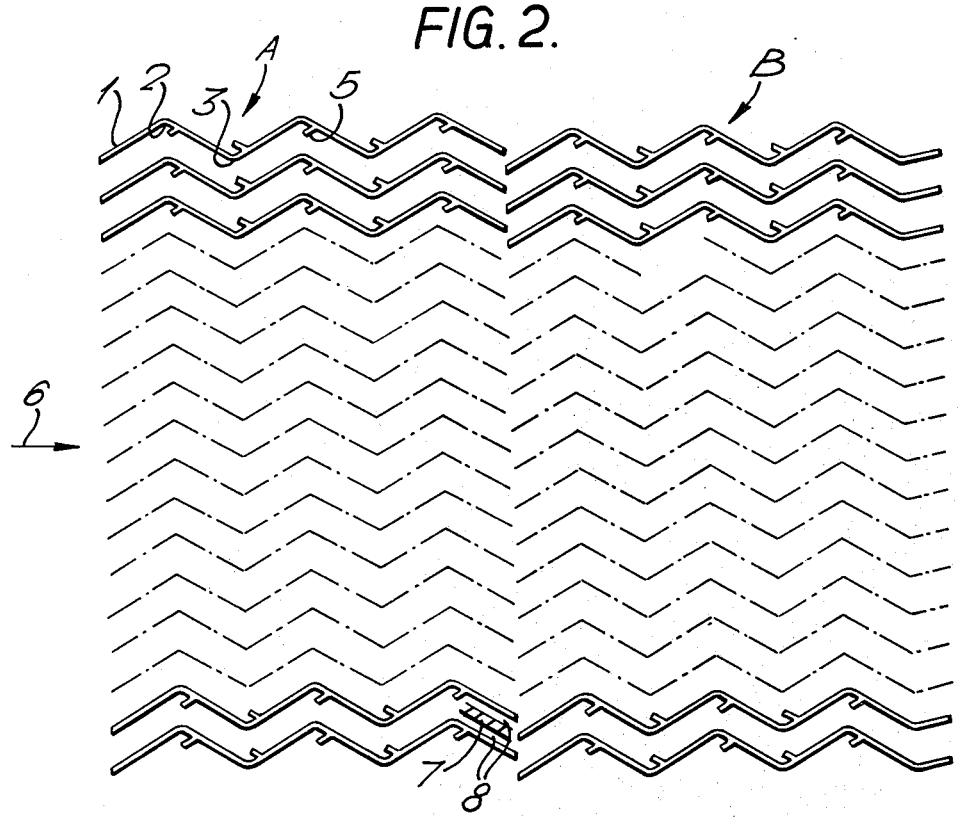
FIG. 2 illustrates a device incorporating two units offset from one another.

Referring particularly to FIG. 2 the two units A and B are shown offset from one another.

Figure 3:
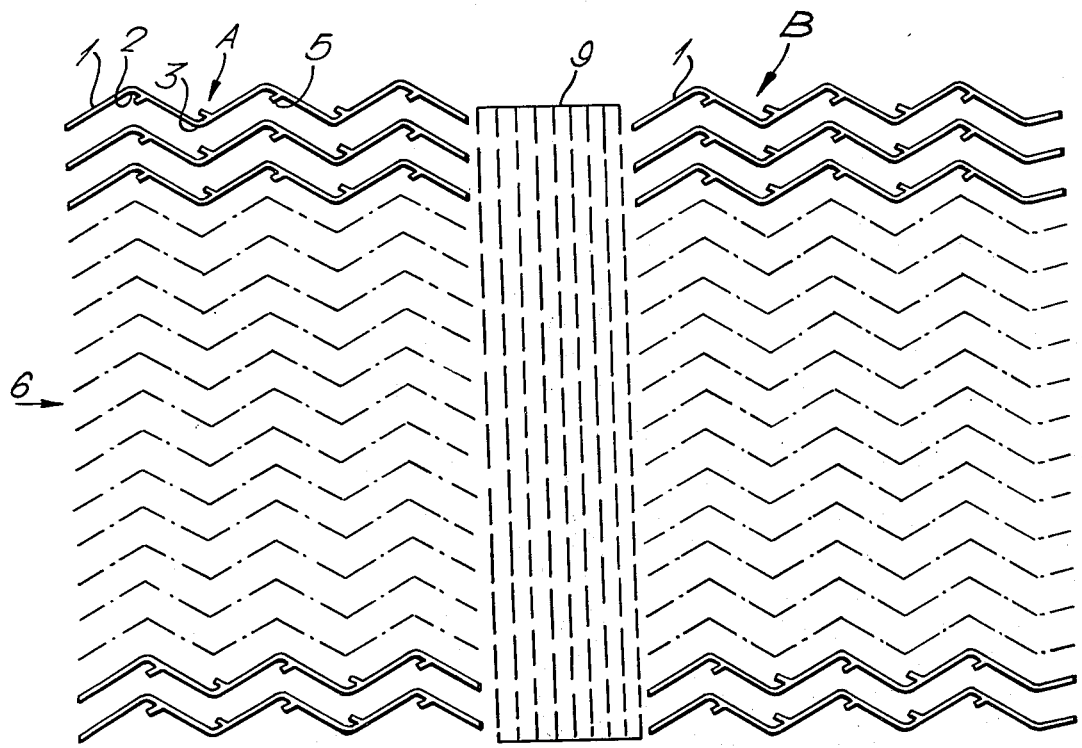
FIG. 3 illustrates a device incorporating two units and a particle-coalescing device arranged between them.

Referring now to FIG. 3, 9 denotes a particle-coalescing device arranged between and in series with the two units A and B. The particle-coalescing device illustrated comprises several perforated plates parallel with and spaced from one another.

In practice, and referring first to FIG. 1, if the spacing of the plates 1 of the unit is such that the distance apart of the adjacent plates is greater than twice the initial distance 8 calculated as pertaining to the geometry and operating conditions of the unit there will be a permanent escape zone 7 between each pair of plates equal to the distance apart of the adjacent plates minus twice the critical distance 8. Particles entering the device in said escape zone 7 are likely to pass through the device without being trapped no matter how long the device might be made. Where substantially complete separation is unnecessary this state of affairs may be quite acceptable.

Where substantially complete separation is desired the construction of FIG. 2 or FIG. 3 may be employed. In the construction of FIG. 2 the escape zone 7 between each pair of adjacent plates of the preceding unit A is split by a plate of the succeeding unit B so that particles which had been in the escape zones 7 of the preceding units A enter the critical distances of the plates of the succeeding unit 8 and immediately become almost certain to be trapped.

As the critical distance in the same unit is different for particles of different sizes, being smaller the smaller the particle, it is obviously easier to trap the larger particles of a fluid stream than the smaller particles. Thus in operation of a unit not providing substantially complete separation the fluid leaving the unit will contain a much greater proportion of smaller particles to larger particles than the fluid entering the unit. The embodiment of FIG. 3 is effective in this situation in reducing the length of the device. The particle-coalescing device 9 brings together groups of small particles and forms a smaller number of larger particles which having a larger critical distance are more readily trapped. This makes it possible for a shorter unit to be employed to provide the desired degree of separation.

Although a unit having adjacent plates twice the critical distance apart for the smallest particle to be separated can be made to separate substantially all particles down to the smallest size, in practice the unit requires to be a certain minimum length to do this. In circumstances where this minimum length might be inconveniently great the constructions of FIGS. 2 and 3 may be employed to reduce the length of the device while providing the same degree of separation. The construction of FIG. 2 causes particles which although within the critical distance in the preceding unit A had not yet been trapped by the shortened unit A and had thus been able to escape from the preceding unit A to enter the succeeding unit B in positions further within the critical distance thus greatly enhancing their chances of being captured. The construction of FIG. 3 operates as already described, i.e. the smaller particles are brought relatively nearer the plates by being changed into larger particles which have a greater critical distance.

The critical distance will normally be calculated on the basis of the size of the smallest particle to be removed from the fluid stream.

If a higher degree of separation is required the fluid may be passed through subsequent coalescing devices and separating units arranged alternately. The separating device of the invention shows an unusually low pressure drop compared with the pressure drop experienced in known separators. This desirable attribute results from the positioning of the vanes 5. In previously known separators of the type incorporating troughs and crests it is customary to provide vanes at the crests, the object being to entrain particles which have not come into contact with the plates. These vanes obstruct the fluid flow and cause a high loss of head in the passage of the fluid through the separator. In the separator according to the present invention the vanes 5 are there for a quite different purpose. They are there to trap particles which have struck the leading face of each crest 3 and which tend to move over the crest and be dragged by the fluid across the trailing face. If the vanes 5 in the troughs 2 were not there some of these particles would move on to the leading face of the following crest 3 and impede the further separation of particles from the moving fluid. The particles moving on to the leading faces might even be caught up by the fluid stream. The vanes 5 intercept these particles. However, the vanes do not obstruct the passage of the fluid because being located close to the bottoms of the troughs 2 they are all in comparatively stagnant zones and thus do not impede the passage of the fluid.

The device is unique in that it provides a high degree of separation with a low pressure drop.

What is claimed is:

1. In a device for separating particles from a fluid stream, comprising casing means defining a fluid stream path between an inlet and an outlet, a plurality of plates located in said casing means in the path of the fluid stream, said plates being formed with troughs and crests and arranged in at least one group constituting a separating unit and oriented such that lines joining the crests and lines joining the troughs of each plate extend in a direction generally parallel to the fluid stream path defined by the casing and such that the crests of each plate face the troughs of each adjacent plate, the axes of the troughs extending transversely of said fluid stream path, said plates defining a plurality of passages between pairs of adjacent plates, said passages being of zig-zag configuration with alternate crests and troughs defined by the crests and troughs of the plates, the improvement comprising upstanding vanes attached to the plates, one vane attached in the bottom half of each trough of its attached plate on the downstream side of the trough with respect to the direction of fluid flow between the plates and orientated to project outwardly from the trough bottom and to lean in the direction towards the upstream side of the same trough, each said vane extending along its trough for substantially the full width of the passage defined by its attached plate and an adjacent plate.

2. A device as claimed in claim 1 including at least two groups of plates arranged in a series offset from one another so that each plate of one group is opposite the space between two adjacent plates of the other group and spaced in a transverse direction from each of the said two plates of the other group by a distance which is half the distance between the median planes of adjacent plates.

3. A device as claimed in claim 2 including more than two groups of plates in the series in which each succeeding group of plates of the series is offset from the immediately preceding group to the same side as the second group is offset from the first group of the series.

4. A device as claimed in claim 1 including at least two units arranged in series with the plates and the vanes of the several units orientated in substantially the same direction and a particle-coalescing device disposed between each preceding unit and the succeeding unit of the series, each said particle-coalescing device comprising means for bringing together groups of small particles and forming a smaller number of larger particles.

5. A device as claimed in claim 4 in which the particle-coalescing device includes a foraminous diaphragm.

6. A device as claimed in claim 4 in which the particle-coalescing device includes several perforated plates parallel with and spaced from one another.

7. A device as claimed in claim 1 in which each vane is located in a region of the trough nearer the bottom of the trough than the following crest.

8. A device as claimed in claim 1 including a particle-coalescing device disposed in the fluid stream path on the upstream side of said unit, said particle-coalescing device comprising means for bringing together groups of small particles and forming a smaller number of larger particles which are more readily trapped.

* * * * *